United States Patent
Nishiura et al.

(10) Patent No.: US 8,686,106 B2
(45) Date of Patent: *Apr. 1, 2014

(54) POLYAMIC ACID SOLUTION COMPOSITION HAVING CARBON BLACK DISPERSED THEREIN, PROCESS FOR PRODUCTION OF SEMICONDUCTIVE POLYIMIDE RESIN BELT USING THE COMPOSITION, AND SEMICONDUCTIVE POLYIMIDE RESIN BELT

(75) Inventors: Naoki Nishiura, Konan (JP); Akira Ichino, Moriyama (JP); Takashi Kuraoka, Moriyama (JP); Toru Murakami, Ube (JP); Takeshige Nakayama, Ube (JP)

(73) Assignees: Gunze Limited, Kyoto (JP); UBE Industries, Ltd., Yamaguchi (JP)

(*) Notice: Subject to any disclaimer, the term of this patent is extended or adjusted under 35 U.S.C. 154(b) by 576 days.

This patent is subject to a terminal disclaimer.

(21) Appl. No.: 12/734,960

(22) PCT Filed: Dec. 4, 2008

(86) PCT No.: PCT/JP2008/072070
§ 371 (c)(1),
(2), (4) Date: Jun. 4, 2010

(87) PCT Pub. No.: WO2009/072569
PCT Pub. Date: Jun. 11, 2009

(65) Prior Publication Data
US 2010/0247888 A1 Sep. 30, 2010

(30) Foreign Application Priority Data

Dec. 6, 2007 (JP) ................................. 2007-316198

(51) Int. Cl.
*C08G 69/26* (2006.01)

(52) U.S. Cl.
USPC ........... 528/353; 252/511; 524/495; 524/496; 528/170; 528/172; 528/310

(58) Field of Classification Search
USPC .................. 528/310, 170, 172, 353; 252/511; 524/495, 496
See application file for complete search history.

(56) References Cited

U.S. PATENT DOCUMENTS

| 6,101,360 A | 8/2000 | Hara et al. |
|---|---|---|
| 6,303,054 B1 * | 10/2001 | Kanetake et al. ............. 252/511 |
| 2006/0159898 A1 | 7/2006 | Uchiyama et al. |
| 2007/0178264 A1 | 8/2007 | Nishiura et al. |
| 2010/0056718 A1 | 3/2010 | Murakami et al. |
| 2010/0305295 A1 | 12/2010 | Nakayama et al. |

FOREIGN PATENT DOCUMENTS

| EP | 1 721 924 | 11/2006 |
|---|---|---|
| EP | 2 090 609 | 8/2009 |
| EP | 2 223 954 | 9/2010 |
| JP | 62-115887 | 5/1987 |
| JP | 2-273984 | 11/1990 |
| JP | 7-156287 | 6/1995 |
| JP | 10-63115 | 3/1998 |
| JP | 10-83122 | 3/1998 |
| JP | 2000-129001 | 5/2000 |
| JP | 2001-260151 | 9/2001 |
| JP | 2002-341673 | 11/2002 |
| JP | 2003-266454 | 9/2003 |
| JP | 2006-225625 | 8/2006 |
| JP | 2007-1262 | 1/2007 |
| JP | 2008-74900 | 4/2008 |
| JP | 2008-76518 | 4/2008 |
| WO | 2005/085324 | 9/2005 |
| WO | 2008/035647 | 3/2008 |
| WO | 2008/059801 | 5/2008 |

OTHER PUBLICATIONS

International Search Report issued Jan. 13, 2009 in International (PCT) Application No. PCT/JP2008/072070.
Supplementary European Search Report dated Oct. 17, 2011 issued in European Application corresponding to present U.S. application.
Chinese Office Action (with English translation) issued Aug. 31, 2011 in corresponding Chinese Application No. 200880119486.3.
Complete English translation of JP 62-115887, published May 27, 1987.

\* cited by examiner

*Primary Examiner* — Gregory Listvoyb
(74) *Attorney, Agent, or Firm* — Wenderoth, Lind & Ponack, L.L.P.

(57) ABSTRACT

The present invention provides a carbon black-dispersed polyamic acid solution composition having a high solids content and a high carbon black content. The invention further provides an intermediate transfer belt using the polyamic acid solution composition. The carbon black-dispersed polyamic acid solution composition is obtained by uniformly dispersing carbon black in a polyamic acid solution obtained by reacting biphenyltetracarboxylic dianhydride and an aromatic diamine in an organic polar solvent. The biphenyltetracarboxylic dianhydride includes 2,3,3',4'-biphenyltetracarboxylic dianhydride and 3,3',4,4'-biphenyltetracarboxylic dianhydride. The aromatic diamine includes 4,4'-diaminodiphenyl ether and p-phenylenediamine. The polyamic acid solution has a solids content of 25 weight % or more.

7 Claims, 1 Drawing Sheet

POLYAMIC ACID SOLUTION COMPOSITION HAVING CARBON BLACK DISPERSED THEREIN, PROCESS FOR PRODUCTION OF SEMICONDUCTIVE POLYIMIDE RESIN BELT USING THE COMPOSITION, AND SEMICONDUCTIVE POLYIMIDE RESIN BELT

TECHNICAL FIELD

The present invention relates to a carbon black-dispersed polyamic acid solution composition, a process for producing a semiconductive polyimide belt using such a composition, and a semiconductive polyimide resin belt. The semiconductive polyimide resin belt of the present invention is used as an intermediate transfer belt for devices having a color image-forming unit, such as electrophotographic copying machines, printers, facsimiles, multifunctional devices thereof, and digital printers.

BACKGROUND ART

As the recent demands for office automation equipment extend not only to higher speed and image quality, but also to improved durability for key components of the equipment, it is now indispensable for intermediate transfer belts to have materials designed to stably produce high-quality transfer images over an extended period of time. The development of a technique for producing an intermediate transfer belt having both excellent electrical and physical properties is becoming increasingly important. Excellent electrical properties include, for example, the ability to achieve accurate image transfers in a color image-forming unit, and the ability to prevent variations in resistance due to the transfer voltage, enabling high-quality transfer images to be stably produced over an extended period of time. Excellent physical properties include, for example, little deterioration in flatness due to plastic deformation caused by loads applied to the width direction of the belt, excellent bending durability, and stable operation even after extended use.

A carbon black-dispersed polyamic acid solution composition, used as a feedstock for such an intermediate transfer belt, is generally produced by uniformly dispersing and mixing carbon black that is added to a polyamic acid solution prepared by the polymerization of tetracarboxylic dianhydride and diamine. Polyamic acid solutions used in intermediate transfer belts generally have a high molecular weight in view of the mechanical properties and the like of the belts. However, such high molecular weight polyamic acid has only limited solubility in organic polar solvents, and its concentration cannot be increased.

Further, because the addition of carbon black to a polyamic acid solution increases the viscosity of the solution, it is difficult to grind the carbon black even with the force of impact between the balls of a disperser such as a bead mill. Therefore, the formation of a uniform dispersion of carbon black in a polyamic acid solution must involve grinding the carbon black by a disperser, and a surface phenomenon known as "wetting", in which the carbon black being pulverized is wetted by the solvent. Currently, a uniform carbon black dispersion is obtained by adding a large amount of organic polar solvent together with the carbon black. Consequently, the solids content of the resulting carbon black-containing polyamic acid solution composition can only be increased to generally about 15 to about 20 weight %.

A polyamic acid solution composition with such a low solids content cannot be easily molded into a thick belt in a single operation. Further, since the composition contains a large amount of organic polar solvent, the evaporation and removal of the solvent takes a great deal of time. These factors add time and costs to complete the entire process, leaving room for improvement in the efficiency and economy of the process.

Various carbon black-dispersed polyamic acid solution compositions have been considered as feedstocks for intermediate transfer belts. Known, for example, are semiconductive polyimide resin belts that are produced from a feedstock solution in which a conductive filler is dispersed in a high molecular weight polyamic acid solution obtained by reacting 3,3',4,4'-biphenyltetracarboxylic dianhydride and p-phenylenediamine (see, for example, Patent Documents 1 to 3). However, the polyamic acid solutions disclosed in these patent documents have a solids content of at most about 20 weight %, and thus, have only a limited solids content. Furthermore, semiconductive belts containing 15 weight % or more of carbon black in these polyimide resins are very brittle, having lost the inherent toughness of polyimide resins. Therefore, when such semiconductive belts are used as intermediate transfer belts, they become cracked or broken by loads applied to the width direction of the belts.

Semiconductive belts containing a copolymer of 3,3',4,4'-biphenyltetracarboxylic dianhydride, p-phenylenediamine, and 4,4'-diaminodiphenyl ether are known as belts that retain the inherent toughness of polyimide resins (see, for example, Patent Documents 4 and 5). However, even the polyamic acid solutions disclosed in these patent documents have a solids content of at most about 20 weight %.

Rotational molding has been considered as a process for producing an intermediate transfer member made of a polyimide resin. Rotational molding is a process wherein a polyimide resin precursor solution is applied to the inner surface of a cylindrical mold, and a film is formed by centrifugal molding. Next, a portion of the solvent is removed and the precursor is subjected to partial imidization until the film becomes self-supporting. The film is then stripped from the mold, the outer surface of a tubular mold is covered with the stripped film, and the solvent is removed and the imidization reaction is completed.

As such a rotational molding process, a process has been disclosed wherein molding is performed under specific conditions such that the influence of centrifugal force in the centrifugal molding step can be reduced (see, for example, Patent Document 6). According to Patent Document 6, the reduced influence of centrifugal force in the centrifugal molding step prevents particles of carbon black and the like from concentrating in the thickness direction of the belt, thus enabling the production of a belt with a flatness of 2 mm or less. This process, however, suffers from the following problem: In the imidization step, the solvent remaining in the stripped belt gathers between the belt and the tubular mold, thereby causing the belt to expand. The shrinkage of the belt that subsequently occurs during the imidization reaction degrades the flatness of the belt, thereby causing the belt to ripple.

Patent Document 1: Japanese Unexamined Patent Publication No. 7-156287
Patent Document 2: Japanese Unexamined Patent Publication No. 10-63115
Patent Document 3: Japanese Unexamined Patent Publication No. 10-83122
Patent Document 4: Japanese Unexamined Patent Publication No. 2002-341673
Patent Document 5: Japanese Unexamined Patent Publication No. 2003-266454

Patent Document 6: Japanese Unexamined Patent Publication No. 2001-260151

DISCLOSURE OF THE INVENTION

Problems to be Solved by the Invention

In view of the problems of prior art described above, it is an object of the invention to provide a carbon black-dispersed polyamic acid solution composition having a high solids content and a high carbon black content. It is another object of the invention to provide a process for producing a semiconductive polyimide resin belt using the polyamic acid solution composition, and a semiconductive polyimide resin belt capable of producing a high-quality transfer image in a color image-forming unit.

Means for Solving the Problems

The inventors conducted extensive research to solve the above-mentioned objects, and consequently found that the above-mentioned objects can be solved by providing a carbon black-dispersed polyamic acid solution composition obtained by uniformly dispersing carbon black in a polyamic acid solution obtained by reacting biphenyltetracarboxylic dianhydride and an aromatic diamine in an organic polar solvent; wherein the biphenyltetracarboxylic dianhydride includes 2,3,3',4'-biphenyltetracarboxylic dianhydride and 3,3',4,4'-biphenyltetracarboxylic dianhydride, and the aromatic diamine includes 4,4'-diaminodiphenyl ether and p-phenylenediamine; and wherein the polyamic acid solution has a solids content of 25 weight % or more. The invention was completed upon further studies based on this finding.

Specifically, the invention provides a carbon black-dispersed polyamic acid solution composition, a process for producing a semiconductive polyimide resin belt using the polyamic acid solution composition, and a semiconductive polyimide resin belt, as summarized below.

Item 1. A carbon black-dispersed polyamic acid solution composition comprising a polyamic acid solution and carbon black uniformly dispersed therein, the polyamic acid solution being obtained by reacting biphenyltetracarboxylic dianhydride and an aromatic diamine in an organic polar solvent;

the biphenyltetracarboxylic dianhydride comprising 2,3,3',4'-biphenyltetracarboxylic dianhydride and 3,3',4,4'-biphenyltetracarboxylic dianhydride;

the aromatic diamine comprising 4,4'-diaminodiphenyl ether and p-phenylenediamine; and the polyamic acid solution having a solids content of 25 weight % or more.

Item 2. The carbon black-dispersed polyamic acid solution composition according to Item 1, wherein the polyamic acid solution comprises 15 to 50 mol % of 2,3,3',4'-biphenyltetracarboxylic dianhydride and 85 to 50 mol % of 3,3',4,4'-biphenyltetracarboxylic dianhydride per total biphenyltetracarboxylic dianhydride components; and comprises 20 to 80 mol % of 4,4'-diaminodiphenyl ether and 80 to 20 mol % of p-phenylenediamine per total aromatic diamine components.

Item 3. The carbon black-dispersed polyamic acid solution composition according to Item 1 or 2, wherein the carbon black content is 15 to 30 weight % based on total solids of the carbon black-dispersed polyamic acid solution composition.

Item 4. The carbon black-dispersed polyamic acid solution composition according to any one of Items 1 to 3, wherein the carbon black is obtained by subjecting carbon black produced by an oil furnace process to oxidation treatment, and wherein the carbon black after the oxidation treatment has a pH of 2 to 5, a volatile matter content of 2 to 6 weight %, a nitrogen adsorption specific surface area of 60 to 150 $m^2/g$, a dibutyl phthalate absorption of 40 to 120 ml/100 g, and an amount of extracted undecomposed feedstock hydrocarbons of 10 ppm or less.

Item 5. A semiconductive polyimide resin belt comprising a polyimide resin and carbon black, the polyimide resin comprising structural units represented by Formulae (1) to (4):

Item 6. The semiconductive polyimide resin belt according to Item 5, wherein the polyimide resin comprises, based on a total amount of the structural units represented by Formulae (1) and (2), 15 to 50 mol % of the structural unit represented by Formula (1) and 85 to 50 mol % of the structural unit represented by Formula (2); and comprising, based on a total amount of the structural units represented by Formulae (3) and (4), 20 to 80 mol % of the structural unit represented by Formula (3) and 80 to 20 mol % of the structural unit represented by Formula (4).

Item 7. The semiconductive polyimide resin belt according to Item 5 or 6, wherein the carbon black content in the semiconductive polyimide resin belt is 15 to 30 weight %.

Item 8. The semiconductive polyimide resin belt according to any one of Items 5 to 7, wherein the carbon black is obtained by subjecting carbon black produced by an oil furnace process to oxidation treatment, and wherein the carbon black after the oxidation treatment has a pH of 2 to 5, a volatile matter content of 2 to 6 weight %, a nitrogen adsorption specific surface area of 60 to 150 $m^2/g$, a dibutyl phthalate absorption of 40 to 120 ml/100 g, and an amount of extracted undecomposed feedstock hydrocarbons of 10 ppm or less.

Item 9. A process for producing a semiconductive polyimide resin belt by molding the carbon black-dispersed polyamic acid solution composition of any one of Items 1 to 4 into a tubular shape by rotational molding, and subsequently imidizing the molded product by heat treatment, the process comprising the steps of:

(1) applying the carbon black-dispersed polyamic acid solution composition to an inner surface of a cylindrical mold while the cylindrical mold is rotated at a centrifugal acceleration of 0.5 to 10 times the gravitational acceleration;

(2) forming a self-supporting film by heating the cylindrical mold at a temperature of 100 to 140° C. while the cylindrical mold is rotated at a centrifugal acceleration of 0.5 to 10 times the gravitational acceleration; and (3) imidizing the film at a temperature of 300° C. or more, with the film adhering to the inner surface of the cylindrical mold.

Item 10. A semiconductive polyimide resin belt produced by the process of Item 9, having a surface resistivity of $10^8$ to $10^{14}$ Ω/sq.

Item 11. A semiconductive polyimide resin belt produced by the process of Item 9, having a flatness of 2 mm or less in a width direction of the belt.

The invention will be described in detail below.

1. Carbon Black-Dispersed Polyamic Acid Solution Composition

The invention relates to a carbon black-dispersed polyamic acid solution composition comprising a polyamic acid solution and carbon black dispersed therein. The polyamic acid solution is obtained by reacting biphenyltetracarboxylic dianhydride and an aromatic diamine in an organic polar solvent. The biphenyltetracarboxylic dianhydride includes 2,3,3',4'-biphenyltetracarboxylic dianhydride and 3,3',4,4'-biphenyltetracarboxylic dianhydride, and the aromatic diamine includes 4,4'-diaminodiphenyl ether and p-phenylenediamine, and wherein the polyamic acid solution has a solids content of 25 weight % or more.

Preferably, the biphenyltetracarboxylic dianhydride and aromatic diamine are reacted in substantially equimolar proportions.

The proportions of 2,3,3',4'-biphenyltetracarboxylic dianhydride and 3,3',4,4'-biphenyltetracarboxylic dianhydride are not limited, but are preferably 15 to 50 mol % and 85 to 50 mol %, respectively, and more preferably 20 to 30 mol % and 80 to 70 mol %, respectively, per total biphenyltetracarboxylic dianhydride components. The above-mentioned proportions are preferable because they enable the production of a belt with well balanced flexibility and rigidity as well as excellent flatness that is free from curving or the like at the edge portions thereof.

The proportions of 4,4'-diaminodiphenyl ether and p-phenylenediamine are not limited, but are preferably 20 to 80 mol % and 80 to 20 mol %, respectively, and more preferably 40 to 60 mol % and 60 to 40 mol %, respectively, per total aromatic diamine components. The above-mentioned proportions are preferable because they can avoid molecular weight reduction, gelation caused by partial imidization, etc., thus imparting excellent storage stability to the polyamic acid solution.

Furthermore, a semiconductive polyimide resin belt produced from the carbon black-dispersed polyamic acid solution composition including the biphenyltetracarboxylic dianhydride components and aromatic diamine components is preferably used as an intermediate transfer belt, because it exhibits excellent physical properties including little deterioration in flatness due to plastic deformation caused by loads applied to the width direction of the belt, excellent bending durability, and stable operation even after extended use.

The organic polar solvent is not limited, but is preferably an aprotic organic polar solvent. Examples of aprotic organic polar solvents include N-methyl-2-pyrrolidone (hereinafter also referred to as "NMP"), N,N-dimethylformamide, N,N-diethylformamide, N,N-dimethylacetamide, dimethyl sulfoxide, hexamethylphosphoramide, and 1,3-dimethyl-2-imidazolidinone. These solvents may be used alone or as a mixture of two or more solvents. Particularly preferred among the above is NMP, because it has a high boiling point, i.e., 200° C. or higher, and is unlikely to evaporate from the film during imidization by heating, thus facilitating the imidization due to the plasticization effect provided by the residual solvent.

The solids content of the polyamic acid solution is 25 weight % or more, and preferably 25 to 40 weight %. When the solids content of the polyamic acid solution is within these ranges, a belt with a thickness of 90 μm or more can be readily produced, and the small amount of solvent used reduces the cost and facilitates the removal of solvent by evaporation. In the invention, the inclusion of asymmetric biphenyltetracarboxylic dianhydride can make the polyamic acid more soluble in an organic polar solvent, thus enabling the polyamic acid solution to be adjusted to a high solids content as mentioned above.

If a large amount of solvent is evaporated, the buoyancy and the surface tension that cause heat convection or evaporative convection in the drying step will increase. Changes in viscosity and density due to the solvent evaporation will also increase. These can cause a phenomenon known as "floating", which occurs when the dispersion state of the carbon black is nonuniform. However, because the polyamic acid solution composition in the invention contains a small amount of solvent, such problems can be minimized.

The viscosity of the polyamic acid solution at 30° C. is not limited, but may preferably be 3.0 to 50 Pa·s, and more preferably 5.0 to 20 Pa·s.

The method of mixing the carbon black in the polyamic acid solution is not limited, as long as the carbon black is uniformly mixed and dispersed in the polyamic acid solution. Examples of such methods include methods using a sand mill, a bead mill, an ultrasonic mill, a three-roll mill, and the like.

The solids content of the carbon black-dispersed polyamic acid solution composition is preferably 23 to 45 weight %, and more preferably 25 to 45 weight %. These ranges of solids content are preferable because they can prevent the formation of a network or aggregated structure of the carbon black, thus enabling adjustments to be made to the carbon black concentration in the carbon black-dispersed polyamic acid solution composition, and consequently, imparting stable flow characteristics to the composition even during the molding of the belt.

Furthermore, the carbon black content in the carbon black-dispersed polyamic acid solution composition is preferably 15 to 30 weight %, and more preferably 24 to 30 weight %, based on the total solids of the carbon black-dispersed polyamic acid solution composition. When the carbon black-dispersed polyamic acid solution composition containing carbon black within these ranges is used as, for example, an intermediate transfer belt of a color image-forming unit, stable charging and discharging can be ensured in the belt, and high-quality transfer images can be produced over an extended period of time. Furthermore, when the carbon black content is within the above-mentioned ranges, sufficient strength can be maintained for the intermediate transfer belt, thus protecting the intermediate transfer member from problems such as breakage even during extended use.

As used herein, the "carbon black content in the carbon black-dispersed polyamic acid solution composition" means the carbon black content in a semiconductive polyimide resin belt produced from the composition.

The composition may contain additives, such as imidazole compounds (2-methylimidazole, 1,2-dimethylimidazole, 2-methyl-4-methylimidazole, 2-ethyl-4-ethylimidazole, and 2-phenylimidazole) and surfactants (fluorosurfactants and the like), as long as the effects of the invention are not impaired.

According to the method described above, a carbon black-dispersed polyamic acid solution composition in which carbon black is uniformly dispersed can be produced.

The viscosity of the carbon black-dispersed polyamic acid solution composition at 30° C. is, for example, preferably 0.5 to 50 Pa·s, and more preferably 1 to 10 Pa·s, in order to minimize adverse dispersion of carbon black.

The average particle size of the carbon black dispersed in the solution is preferably 0.1 to 0.5 µm, and more preferably 0.1 to 0.3 µm. The maximum particle size of the carbon black dispersed in the solution is preferably 1 µm or less, and more preferably 0.6 µm or less. Although the lower limit of the maximum particle size is not limited, it is preferably 0.2 µm or more.

2. Carbon Black

Examples of the carbon black used in the invention include, but are not limited to, carbon black whose electrical conductivity has been controlled by grafting a polymer to the surface of carbon black particles, or by coating the surface of carbon black particles with an insulating material; and carbon black obtained by subjecting the surface of carbon black particles to oxidation treatment. Among the above, carbon black obtained by an oil furnace process is preferable because it is produced by the pyrolysis of hydrocarbons in a reducing atmosphere under a high-temperature gas at 1,400° C. or higher created by fuel combustion, and therefore, has a significantly reduced content of oxygen and impurities inside and on the surface of the particles, thus allowing the development of crystallites. More preferably, the carbon black produced by an oil furnace process is subjected to oxidation treatment, and still more preferably, such carbon black is adjusted to a volatile matter content of 2 to 6 weight % by the oxidation treatment.

The following describes carbon black obtained by subjecting carbon black produced by an oil furnace process to oxidation treatment, and thereby adjusting the volatile matter content of the carbon black.

Examples of oxidizing agents used in the oxidation treatment include nitrogen oxides containing nitric acid, ozone, hypochlorous acid, and sulfuric acid gas. Among the above, oxidizing agents containing ozone are preferred, with ozone being particularly preferred, because they leave little residue in the carbon black after the oxidation treatment, and decompose undecomposed feedstock hydrocarbons (PAH). The amount of undecomposed feedstock hydrocarbons (PAH) should be kept as low as possible, and may specifically be 10 ppm or less.

The volatile matter content of the carbon black after the oxidation treatment is preferably 2 to 6 weight %, and more preferably 2.5 to 5 weight %.

The surface of the carbon black adjusted to a volatile matter content of 2 to 6% by the oxidation treatment has oxygen functional groups such as a phenolic hydroxyl group, a carbonyl group, and a carboxyl group, with a carboxyl group being particularly preferable. This improves the fluidity and dispersion stability of the carbon black in the polyamic acid solution, and improves the affinity for the polyimide resin.

In the carbon black produced by an oil furnace process, there is an almost proportional relationship between the volatile matter content and the powder resistance, provided that the specific surface area and the dibutyl phthalate adsorption (DBP absorption) remain constant. Since the oxygen functional groups corresponding to the volatile matter content on the surface of the carbon black act as an insulator inhibiting the flow of it electrons, carbon black produced by an oil furnace process and subjected to oxidation treatment has a greater powder resistance than carbon black produced by an oil furnace process but not subjected to oxidation treatment. Thus, by setting the volatile matter content within the above-mentioned range, the powder resistance of the carbon black can be controlled to a value as high as about 3 to about 30 Ω·cm.

This makes it possible to increase the carbon black load of the polyimide resin (the carbon black content is 15 to 30 weight % in the polyimide belt, i.e., based on the total weight of the polyimide resin and carbon black) when setting the surface resistivity of the polyimide resin belt within a desired range ($10^8$ to $10^{14}$ Ω/sq.). In this manner, a polyimide resin belt can be obtained which is provided with electrical conductivity due to the formation of carbon black chains, and which has stable electrical properties that will not be easily affected by the external environment or applied voltage. In other words, the carbon black content in the total solids of the carbon black-dispersed polyamic acid solution composition can be controlled to a value as high as 15 to 30 weight %.

The volatile matter content of the carbon black is measured according to the method described in the Examples below.

Carbon black with a volatile matter content of less than 2% (for example, Mitsubishi carbon black MA-11 and MA-100, available from Mitsubishi Chemical Corporation; and Printex 95 and Printex L6, available from Degussa) does not have sufficient affinity for the polyamic acid solution, and thus, tends to form a secondary aggregate by the Van der Waals force after being dispersed.

Most types of carbon black having a volatile matter content exceeding 6% (for example, Color Black FW 200, Special Black 5, Special Black 4, and Printex 150T; available from Degussa) are produced by a channel process, and contain large amounts of impurities such as sulfur and undecomposed feedstock hydrocarbons (PAH), in addition to hydrogen and oxygen. These impurities tend to degrade the inherent mechanical properties of the binder resin, such as polyimide resin. When carbon black produced by an oil furnace process is subjected to oxidation treatment such that the volatile matter content exceeds 6%, the powder resistance will substantially increase (because the resulting product is insulating carbon black); therefore, the surface resistivity of $10^8$ to $10^{14}$ Ω/sq. that is required for the intermediate transfer belt often cannot be achieved.

The carbon black used in the invention preferably has a nitrogen adsorption specific surface area (JIS K6217) of 60 to 150 $m^2/g$, and more preferably 80 to 130 $m^2/g$.

Generally, the oxidation of carbon black by various methods will increase the number of oxygen functional groups as the specific surface area increases. However, the powder resistance of the carbon black, as well as the physical properties of various materials containing the carbon black, are correlated with the number of oxygen functional groups present in a unit surface of the carbon black, rather than with the absolute number of oxygen functional groups.

A nitrogen adsorption specific surface area of less than 60 $m^2/g$ cannot provide carbon black with affinity for a polyamic acid solution, often resulting in insufficient powder resistance. On the other hand, a nitrogen adsorption specific surface area exceeding 150 $m^2/g$ will result in carbon black having a large specific surface area, i.e., carbon black having a small primary particle size, or carbon black having pores even with the same particle size. Providing oxygen functional groups to such carbon black will not increase the powder resistance of the carbon black. Therefore, a semiconductive polyimide resin belt having a high carbon black content (for example, a high carbon black load of 15 weight % or more)

often cannot be obtained. That is, the resulting semiconductive polyimide resin belt often has only a low carbon black load.

The carbon black used in the invention has a pH of 2 to 5, preferably 2 to 4, and more preferably 2 to 3.

Furthermore, the carbon black used in the invention preferably has a dibutyl phthalate absorption (DBP absorption) of 40 to 120 ml/100 g, and more preferably 50 to 90 ml/100 g. If the DBP absorption exceeds 120 ml/100 g, the powder resistance of the carbon black cannot be increased by oxidation treatment, often making it impossible to obtain a semiconductive polyimide resin belt loaded with carbon black in a high concentration, i.e., 15 weight % or more. If the DBP absorption is less than 40 ml/100 g, the powder resistance will become too high; therefore, a semiconductive polyimide resin belt cannot be obtained unless carbon black is loaded to a concentration exceeding 30 weight % in the solids content.

In the carbon black used in the invention, the amount of undecomposed feedstock hydrocarbons (PAH) should be kept as low as possible. Specifically, an amount of PAH of 10 ppm or less will result in only a small amount thereof reacting with nitrogen oxide, and hence, the nitro compounds produced will be negligible. These undecomposed feedstock hydrocarbons (PAH) can be decomposed by oxidation treatment (particularly oxidation treatment using ozone).

3. Semiconductive Polyimide Belt

The present invention relates to a semiconductive polyimide resin belt comprising a polyimide resin and carbon black, wherein the polyimide resin contains structural units represented by Formulae (1) to (4).

The semiconductive polyimide belt can be produced by molding the carbon black-dispersed polyamic acid solution composition described above.

The structural units represented by Formulae (1) to (4) are derived from 2,3,3',4'-biphenyltetracarboxylic dianhydride, 3,3',4,4'-biphenyltetracarboxylic dianhydride, 4,4'-diaminodiphenyl ether, and p-phenylenediamine, respectively. The polyimide resin comprises the following polyimide ring-containing repeating units having structural units (1) and (2) derived from biphenyltetracarboxylic dianhydride components, and structural units (3) and (4) derived from diamine components.

In terms of the proportion of the structural units represented by Formula (1) and Formula (2), it is preferable that 15 to 50 mol % of the structural unit represented by Formula (1) and 85 to 50 mol % of the structural unit represented by Formula (2) be contained per total amount of the structural units represented by Formulae (1) and (2). It is more preferable that the percentage of the structural unit represented by Formula (1) be 20 to 30 mol % and that represented by Formula (2) be 80 to 70 mol % per total amount of the structural units represented by Formulae (1) and (2). Having such a proportion makes it possible to obtain a belt with well balanced flexibility and rigidity as well as excellent flatness that is free from curving or the like at the edge portions thereof.

A preferable proportion of the structural units represented by Formulae (3) and (4) is that 20 to 80 mol % of the structural unit represented by Formula (3) and 80 to 20 mol % of the structural unit represented by Formula (4) be contained per total amount of the structural units represented by Formulae (3) and (4). It is more preferable that 40 to 60 mol % of the structural unit represented by Formula (3) and 60 to 40 mol % of the structural unit represented by Formula (4) be contained per total amount of the structural units represented by Formulae (3) and (4).

The type and amount of carbon black are not particularly limited as long as they are the type and amount described above.

4. Process for Producing a Semiconductive Polyimide Belt

The present invention relates to a process for producing a semiconductive polyimide resin belt by molding the carbon black-dispersed polyamic acid solution composition described above by rotational molding into a tubular shape, and subsequently imidizing the molded product by heat treatment. The process includes the following steps:

(1) applying the carbon black-dispersed polyamic acid solution composition to the inner surface of a cylindrical mold while the cylindrical mold is rotated at a centrifugal acceleration of 0.5 to 10 times the gravitational acceleration;

(2) forming a self-supporting film by heating the cylindrical mold at a temperature of 100 to 140° C. while the cylindrical mold is rotated at a centrifugal acceleration of 0.5 to 10 times the gravitational acceleration; and (3) imidizing the film at a temperature of 300° C. or more, with the film adhering to the inner surface of the cylindrical mold.

The following describes a process for producing a semiconductive polyimide belt using the carbon black-dispersed polyamic acid solution composition (hereinafter, also referred to simply as "liquid feedstock").

The liquid feedstock is applied in uniform thickness onto the inner surface of a cylindrical mold that is being rotated at a low speed of centrifugal acceleration, i.e., 0.5 to 10 times the gravitational acceleration. More specifically, because the liquid feedstock is supplied at a low speed of centrifugal acceleration, i.e., 0.5 to 10 times the gravitational acceleration, the shear force exerted on the liquid feedstock in the rotational direction is small, making it possible to suppress the orientation of the molecular chains, and the structural orientation of fillers such as carbon black.

When the centrifugal acceleration is less than 0.5 times the gravitational acceleration, there is a risk that the supplied liquid feedstock may fall (drip) off, instead of adhering to the inner surface of the cylindrical mold. The centrifugal acceleration is at most 10 times the gravitational acceleration, because it would otherwise cause the liquid feedstock to flow under the centrifugal force, in addition to exerting a shear force in the rotational direction, and cause the orientation of the molecular chains and the structural orientation of fillers such as carbon black. This may adversely affect the surface flatness of the resulting belt.

The centrifugal acceleration (G) employed in the present invention is given by the following formula.

$$G(m/s^2) = r \cdot \omega^2 = r \cdot (2 \cdot \pi \cdot n)^2$$

where r represents the radius (m) of the cylindrical mold, ω represents the angular velocity (rad/s), and n represents the number of rotations per second (rpm for the number of rotations per 60 seconds). The reference centrifugal acceleration (g) is 9.8 (m/s$^2$).

The liquid feedstock supply means discharges the liquid feedstock by a nozzle or spray method while moving along the rotational axis of the rotating cylindrical mold to apply the liquid feedstock in uniform thickness onto the inner surface of the cylindrical mold. Here, the term "uniform thickness" means applying the liquid feedstock onto the inner surface of the cylindrical mold with a thickness that is in a range of ±5% relative to the average coating thickness.

The shape of the coating head is not particularly limited and may be suitably selected from circular, rectangular, etc. Further, the coating head is not limited to a particular size, and it may be suitably designed depending on the viscosity of the liquid feedstock to be discharged. The method of applying discharge pressure is not particularly limited, and the pressure may be applied by using, for example, a mohno pump or a gear pump that accommodates compressed air or high-viscosity liquid.

Because the liquid feedstock is applied in uniform thickness onto the inner surface of the cylindrical mold, it is not necessary to form a film of a uniform thickness by the high-speed rotation of the cylindrical mold, or more specifically, by causing the liquid feedstock to flow by using centrifugal force. In rotational molding using centrifugal force, the supplied liquid feedstock is uniformly flowed onto the inner surface of the cylindrical mold by centrifugal force. The flow made by the centrifugal force causes the carbon black particles to align and form a structure along the direction of flow. Often, this has adverse effects on the electrical properties of a polyimide intermediate transfer belt. The method of the present invention, which does not employ high-speed rotation, is nearly free from such a problem.

It is preferable that the inner surface of the cylindrical mold be coated with a mold release agent to prevent the adhesion of the polyimide resin. The type of mold release agent is not particularly limited, as long as it is not affected by the solvent of the liquid feedstock, or by water vapor generated from resin during a heat reaction.

In the liquid resin film-forming step, the solvent is evaporated at a temperature of 100° C. to 140° C. to make the solids content 40 weight % or more, with the cylindrical mold being rotated at a low centrifugal acceleration, i.e., 0.5 to 10 times the gravitational acceleration. This forms a self-supporting film on the inner surface of the cylindrical mold.

In the polyimide resin film-forming step, the film is heated to about 250° C. for 60 to 120 minutes, with the film adhering to the inner surface of the cylindrical mold. The temperature and time vary depending on the type of polyimide resin. The film is further heated to a temperature that completely converts the resin to polyimide, for example, at 300° C. to 350° C. for 30 to 90 minutes, so that a polyimide resin film is formed. Because the film is formed while it adheres to the inner surface of the cylindrical mold, the shrinkage caused by imidization reaction or solvent evaporation can be suppressed, and the exerted stress can act to uniformly orient the polymer chains along the in-plane direction.

As described above, the carbon black-dispersed polyamic acid solution composition has a high solids content and a high carbon black content. A semiconductive polyimide resin belt molded from the carbon black-dispersed polyamic acid solution composition thus has a high carbon black content, as well as toughness and other mechanical properties that are characteristic of polyimide resin.

The average thickness of the semiconductive polyimide belt is adjusted in a range of generally about 50 μm to about 150 μm, preferably about 70 μm to about 120 μm.

The surface resistivity is adjusted in a range of generally about $10^8$ to about $10^{14}$ Ω/sq., preferably about $10^9$ to about $10^{14}$ Ω/sq, and more preferably $10^{10}$ to about $10^{13}$ Ω/sq.

When the semiconductive polyimide belt of the present invention that is produced as described above is used, for example, as an intermediate transfer belt for a color-image-forming unit in an electrophotographic apparatus, stable charging and suitable discharging are ensured, and stable, high-quality transfer images can be produced over an extended period of time.

Effect of the Invention

The carbon black-dispersed polyamic acid solution composition of the present invention excels in carbon black fluidity and dispersion stability, and has a high solids content with an extremely low amount of solvent. A large amount of carbon black is also contained in the solids. Furthermore, when used as an intermediate transfer belt, etc., a polyimide resin belt produced from the polyamic acid solution composition can provide intermediate transfer belts having excellent electrical properties, such as transferring accurate images in a color image-forming unit, preventing changes in resistance due to the transfer voltage, and forming a stable, high-quality transfer image over extended periods of time, while also having excellent physical properties, such as excellent resistance to the deterioration of flatness due to changes in plasticity caused by loads applied to the belt in the width direction, excellent durability, and stable operation even after extended use.

BEST MODE FOR CARRYING OUT THE INVENTION

The following describes the present invention in more detail based on Examples and Comparative Examples. It should be noted, however, that the invention is in no way limited by the descriptions of the following examples.

EXAMPLE 1

Preparation of a Carbon Black-Dispersed Polyamic Acid Solution Composition 5 kg of a polyamic acid solution (having a logarithmic viscosity of about 0.4) was prepared by a synthesis of 30 mol % 2,3,3',4'-biphenyltetracarboxylic dianhydride and 70 mol % 3,3',4,4'-biphenyltetracarboxylic dianhydride per total biphenyltetracarboxylic dianhydride components, and 20 mol % 4,4'-diaminodiphenyl ether and 80 mol % p-phenylenediamine per total aromatic diamine components in an NMP. The polyamic acid solution had a viscosity of 10 Pa·s (30° C.), and a solids content of 25 weight %.

0.38 kg of oil-furnace carbon black (CB1, pH: 2.3, volatile matter content: 3.3 weight %, nitrogen adsorption specific surface area: 110 m²/g, DBP absorption: 65 ml/100 g, amount of extracted undecomposed feedstock hydrocarbon (PAH): 1.5 ppm) and 1.1 kg of NMP were added to the thus-obtained solution, and the carbon black was uniformly dispersed therein using a ball mill, obtaining a carbon black-dispersed polyamic acid solution composition A (hereunder, this composition is referred to as liquid feedstock A). Liquid feedstock A had a nonvolatile matter content of 25.2 weight %, wherein the content of carbon black was 23.3 weight % per total weight of nonvolatile matter. Liquid feedstock A had a viscosity of 1.6 Pa·s (30° C.). The average particle diameter of the carbon black in the solution was 0.23 μm and the maximum particle diameter was 0.38 μm.

(Production of a Carbon Black-Loaded Polyimide Seamless Belt)

Liquid feedstock A was applied to the inner surface of a cylindrical mold having an outer diameter of 324 mm, an inner diameter of 300 mm, and a length of 500 mm by spray coating, while rotating the cylindrical mold at a centrifugal acceleration 6.0 times the gravitational acceleration (about 189 rpm). A film thus molded having a length of 480 mm was uniformly formed onto the 500-mm length of the inner surface of the cylindrical mold. The film thickness was calculated from the nonvolatile matter content and determined so as to make the thickness of the polyimide resin belt 90 μm. The film was heated to 120° C. over a period of 30 minutes, and kept at 120° C. for 90 minutes to evaporate the solvent while rotating the cylindrical mold at a centrifugal acceleration 6.0 times the gravitational acceleration (about 189 rpm).

The tubular substance adhering to the inner surface of the cylindrical mold was then placed into a high-temperature furnace, where it was heated to 320° C. (heating rate: about 1.67° C./min) over a period of 120 minutes, and maintained at 320° C. for 60 minutes to complete the polyimide conversion. After cooling to room temperature, the tubular substance was removed from the mold to obtain a carbon black-loaded polyimide seamless belt having a thickness of 90 μm.

EXAMPLE 2

Preparation of a Carbon Black-Dispersed Polyamic Acid Solution Composition 5 kg of a polyamic acid solution (having a logarithmic viscosity of about 0.32) was prepared by a synthesis of 20 mol % 2,3,3',4'-biphenyltetracarboxylic dianhydride and 80 mol % 3,3',4,4'-biphenyltetracarboxylic dianhydride per total biphenyltetracarboxylic dianhydride components, and 50 mol % 4,4'-diaminodiphenyl ether and 50 mol % p-phenylenediamine per total aromatic diamine components in an NMP. The polyamic acid solution had a viscosity of 25 Pa·s (30° C.), and a solids content of 30 weight %.

0.5 kg of CB1, which was the same as that used in Example 1, and 1.5 kg of NMP were added to the thus-obtained solution, and the carbon black was uniformly dispersed therein using a ball mill, obtaining a liquid feedstock B. Liquid feedstock B had a nonvolatile matter content of 28.6 weight %, wherein the content of carbon black was 25 weight % per total weight of nonvolatile matter. Liquid feedstock B had a viscosity of 2.4 Pa·s (30° C.). The average particle diameter of the carbon black in the solution was 0.24 μm and the maximum particle diameter was 0.41 μm.

(Production of a Carbon Black-Loaded Polyimide Seamless Belt)

A carbon black-loaded polyimide seamless belt (average thickness: 90 μm) was produced in the same manner as in Example 1 except that liquid feedstock B was used.

EXAMPLE 3

Preparation of a Carbon Black-Dispersed Polyamic Acid Solution Composition 5 kg of a polyamic acid solution (having a logarithmic viscosity of about 0.25) was prepared by a synthesis of 20 mol % 2,3,3',4'-biphenyltetracarboxylic dianhydride and 80 mol % 3,3',4,4'-biphenyltetracarboxylic dianhydride per total biphenyltetracarboxylic dianhydride components, and 75 mol % 4,4'-diaminodiphenyl ether and 25 mol % p-phenylenediamine per total aromatic diamine components in an NMP. The polyamic acid solution had a viscosity of 25 Pa·s, and a solids content of 32 weight %.

0.38 kg of oil-furnace carbon black (CB2, pH: 4.1, volatile matter content: 2.3 weight %, nitrogen adsorption specific surface area: 125 m$^2$/g, DBP absorption: 85 ml/100 g, amount of extracted undecomposed feedstock hydrocarbon (PAH): 0.9 ppm) and 1.5 kg of NMP were added to the thus-obtained solution, and the carbon black was uniformly dispersed therein using a ball mill, obtaining a liquid feedstock C. Liquid feedstock C had a nonvolatile matter content of 28.8 weight %, wherein the content of carbon black was 19.2 weight % per total weight of nonvolatile matter. Liquid feedstock C had a viscosity of 1.4 Pa·s (30° C.). The average particle diameter of the carbon black in the solution was 0.24 μm and the maximum particle diameter was 0.44 μm.

(Production of a Carbon Black-Loaded Polyimide Seamless Belt)

A carbon black-loaded polyimide seamless belt (average thickness: 100 μm) was produced in the same manner as in Example 1 except that liquid feedstock C was used.

EXAMPLE 4

Preparation of a Carbon Black-Dispersed Polyamic Acid Solution Composition 5 kg of a polyamic acid solution (having a logarithmic viscosity of about 0.24) was prepared by a synthesis of 50 mol % 2,3,3',4'-biphenyltetracarboxylic dianhydride and 50 mol % 3,3',4,4'-biphenyltetracarboxylic dianhydride per total biphenyltetracarboxylic dianhydride components, and 50 mol % 4,4'-diaminodiphenyl ether and 50 mol % p-phenylenediamine per total aromatic diamine components in an NMP. The polyamic acid solution had a viscosity of 20 Pa·s (30° C.), and a solids content of 35 weight %.

0.5 kg of CB2, which was the same as that used in Example 3, and 1.8 kg of NMP were added to the thus-obtained solution, and the carbon black was uniformly dispersed therein using a ball mill, obtaining a liquid feedstock D. Liquid feedstock D had a nonvolatile matter content of 30.8 weight %, wherein the content of carbon black was 22.2 weight % per total weight of nonvolatile matter. Liquid feedstock D had a viscosity of 1.2 Pa·s (30° C.). The average particle diameter of the carbon black in the solution was 0.24 μm and the maximum particle diameter was 0.44 μm.

(Production of a Carbon Black-Loaded Polyimide Seamless Belt)

A carbon black-loaded polyimide seamless belt (average thickness: 100 μm) was produced in the same manner as in Example 1 except that liquid feedstock D was used.

EXAMPLE 5

Preparation of a Carbon Black-Dispersed Polyamic Acid Solution Composition 5 kg of a polyamic acid solution (having a logarithmic viscosity of about 0.32) was prepared by a synthesis of 20 mol % 2,3,3',4'-biphenyltetracarboxylic dianhydride and 80 mol % 3,3',4,4'-biphenyltetracarboxylic dianhydride per total biphenyltetracarboxylic dianhydride components, and 75 mol % 4,4'-diaminodiphenyl ether and 25 mol % p-phenylenediamine per total aromatic diamine components in an NMP. The polyamic acid solution had a viscosity of 33 Pa·s, and a solids content of 30 weight %.

0.27 kg of carbon black produced by a channel process, "Special Black 4 (SB4)" manufactured by Degussa (pH: 3.0, volatile matter content: 14.5 weight %, nitrogen adsorption specific surface area: 180 m$^2$/g, DBP absorption: 230 ml/100 g, amount of extracted undecomposed feedstock hydrocarbon (PAH): 20 ppm) and 2.0 kg of NMP were added to the thus-obtained solution, and the carbon black was uniformly dispersed therein using a ball mill, obtaining a liquid feedstock E.

Liquid feedstock E had a nonvolatile matter content of 24.3 weight %, wherein the content of carbon black was 15.3 weight % per total weight of nonvolatile matter. Liquid feedstock E had a viscosity of 2.4 Pa·s (30° C.). The average particle diameter of the carbon black in the solution was 0.27 μm and the maximum particle diameter was 0.51 μm.

(Production of a Carbon Black-Loaded Polyimide Seamless Belt)

A carbon black-loaded polyimide seamless belt (average thickness: 90 μm) was produced in the same manner as in Example 1 except that liquid feedstock E was used.

COMPARATIVE EXAMPLE 1

Preparation of a Carbon Black-Dispersed Polyamic Acid Solution Composition 5 kg of a polyamic acid solution (having a logarithmic viscosity of about 0.72) was prepared by a synthesis of 100 mol % 3,3',4,4'-biphenyltetracarboxylic dianhydride and 100 mol % p-phenylenediamine in an NMP. The polyamic acid solution had a viscosity of 5.0 Pa·s, and a solids content of 18 weight %.

0.16 kg of carbon black produced by a channel process, "Special Black 4 (SB4)" manufactured by Degussa, which was used in Example 5, and 1.5 kg of NMP were added to the thus-obtained solution, and the carbon black was uniformly dispersed therein using a ball mill, obtaining a liquid feedstock F. Liquid feedstock F had a nonvolatile matter content of 15.9 weight %, wherein the content of carbon black was 15.1 weight % per total weight of nonvolatile matter. Liquid feedstock F had a viscosity of 1.1 Pa·s (30° C.). The average particle diameter of the carbon black in the solution was 0.27 μm and the maximum particle diameter was 0.51 μm.

(Production of a Carbon Black-Loaded Polyimide Seamless Belt)

A predetermined amount of liquid feedstock F was applied to the inner surface of a cylindrical mold having an outer diameter of 324 mm, an inner diameter of 300 mm, and a length of 500 mm using a nozzle-type discharging device. Liquid feedstock F was uniformly flowcast onto the inner surface of the cylindrical mold by applying a centrifugal acceleration 100 times the gravitational acceleration (about 772 rpm). When the centrifugal acceleration is unduly low, liquid feedstock F does not satisfactorily flow; therefore, liquid feedstock F was molded with an unduly large thickness at the portion to which liquid feedstock F was applied to the cylindrical mold. Therefore, in a rotational molding using centrifugal force, a minimal requirement is that a large centrifugal must be applied to uniformly flowcast liquid feedstock F onto the inner surface of the cylindrical mold.

Thereafter, the rotation of the mold was changed to 6.0 times the gravitational acceleration (about 189 rpm), heated to 120° C. over 30 minutes, and then kept at 120° C. for 120 minutes to evaporate the solvent.

The resulting belt was removed from the inner surface of the cylindrical mold. An aluminum cylindrical mold having an outer diameter of 295 mm and a length of 420 mm was placed in the above-removed belt. The belt was heated to 320° C. over a period of 180 minutes, and maintained at 320° C. for 60 minutes to complete the polyimide conversion. The belt was once removed from the cylindrical mold, because the belt tends to peel from the inner surface of the cylindrical mold or break due to the reaction shrinkage toward the inner direction when conducting polyimide conversion at 150 to 250° C. After cooling to room temperature, the belt was removed from the mold to obtain a carbon black-loaded polyimide seamless belt having an average thickness of 90 μm.

COMPARATIVE EXAMPLE 2

Preparation of a Carbon Black-Dispersed Polyamic Acid Solution Composition 5 kg of a polyamic acid solution (having a logarithmic viscosity of about 0.65) was prepared by a synthesis of 100 mol % 3,3',4,4'-biphenyltetracarboxylic dianhydride together with 30 mol % 4,4'-diaminodiphenyl ether and 70 mol % p-phenylenediamine per total aromatic diamine components in an NMP. The polyamic acid solution had a viscosity of 4.5 Pa·s, and a solids content of 18 weight %.

0.16 kg of carbon black produced by a channel process, "Special Black 4 (SB4)" manufactured by Degussa, which was the same as that used in Example 5, and 1.5 kg of NMP were added to the thus-obtained solution, and the carbon black was uniformly dispersed therein using a ball mill, obtaining a liquid feedstock G. Liquid feedstock G had a nonvolatile matter content of 15.9 weight %, wherein the content of carbon black was 15.1 weight % per total weight of nonvolatile matter. Liquid feedstock G had a viscosity of 1.0 Pa·s (30° C.). The average particle diameter of the carbon black in the solution was 0.27 μm and the maximum particle diameter was 0.55 μm.

(Production of a Carbon Black-Loaded Polyimide Seamless Belt)

A carbon black-loaded polyimide seamless belt (average thickness: 100 μm) was produced in the same manner as in Comparative Example 1 except that liquid feedstock G was used.

COMPARATIVE EXAMPLE 3

Preparation of a Carbon Black-Dispersed Polyamic Acid Solution Composition 5 kg of a polyamic acid solution (having a logarithmic viscosity of about 0.72) was prepared by a synthesis of 100 mol % 3,3',4,4'-biphenyltetracarboxylic dianhydride and 100 mol % p-phenylenediamine in an NMP. The polyamic acid solution had a viscosity of 5.0 Pa·s (30° C.), and a solids content of 18 weight %.

0.275 kg of CB1, which was the same as that used in Example 1, and 2 kg of NMP were added to the thus-obtained solution, and the carbon black was uniformly dispersed therein using a ball mill, obtaining a liquid feedstock H. Liquid feedstock H had a nonvolatile matter content of 16.2 weight %, wherein the content of carbon black was 23.4 weight % per total weight of nonvolatile matter. Liquid feedstock H had a viscosity of 1.2 Pa·s (30° C.). The average particle diameter of the carbon black in the solution was 0.27 μm and the maximum particle diameter was 0.51 μm.

(Production of a Carbon Black-Loaded Polyimide Seamless Belt)

A carbon black-loaded polyimide seamless belt (average thickness: 90 μm) was produced in the same manner as in Comparative Example 1 except that liquid feedstock H was used.

COMPARATIVE EXAMPLE 4

Preparation of a Carbon Black-Dispersed Polyamic Acid Solution Composition 5 kg of a polyamic acid solution (having a logarithmic viscosity of about 0.72) was prepared by a synthesis of 100 mol % 3,3',4,4'-biphenyltetracarboxylic dianhydride together with 30 mol % 4,4'-diaminodiphenyl ether and 70 mol % p-phenylenediamine per total aromatic diamine components in an NMP. The polyamic acid solution had a viscosity of 5.2 Pa·s, and a solids content of 18 weight %.

0.275 kg of CB1, which was the same as that used in Example 1, and 2 kg of NMP were added to the thus-obtained solution, and the carbon black was uniformly dispersed therein using a ball mill, obtaining a liquid feedstock I. Liquid feedstock I had a nonvolatile matter content of 16.2 weight %, wherein the content of carbon black was 23.4 weight % per total weight of nonvolatile matter. Liquid feedstock I had a viscosity of 1.2 Pa·s (30° C.). The average particle diameter of the carbon black in the solution was 0.27 μm and the maximum particle diameter was 0.55 μm.

(Production of a Carbon Black-Loaded Polyimide Seamless Belt)

A carbon black-loaded polyimide seamless belt (average thickness: 100 μm) was produced in the same manner as in Comparative Example 1 except that liquid feedstock I was used.

COMPARATIVE EXAMPLE 5

Preparation of a Carbon Black-Dispersed Polyamic Acid Solution Composition 5 kg of a polyamic acid solution (having a logarithmic viscosity of about 0.4) was prepared by a synthesis of 20 mol % 2,3,3',4'-biphenyltetracarboxylic dianhydride and 80 mol % 3,3',4,4'-biphenyltetracarboxylic dianhydride per total biphenyltetracarboxylic dianhydride components, and 100 mol % p-phenylenediamine in an NMP. The polyamic acid solution had a viscosity of 10.0 Pa·s, and a solids content of 25 weight %.

0.38 kg of CB1, which was the same as that used in Example 1, and 1.1 kg of NMP were added to the thus-obtained solution, and the carbon black was uniformly dispersed therein using a ball mill, obtaining a liquid feedstock J. Liquid feedstock J had a nonvolatile matter content of 25.2 weight %, wherein the content of carbon black was 23.3 weight % per total weight of nonvolatile matter. Liquid feedstock J had a viscosity of 1.5 Pa·s (30° C.). The average particle diameter of the carbon black in the solution was 0.24 μm and the maximum particle diameter was 0.44 μm.

(Production of a Carbon Black-Loaded Polyimide Seamless Belt)

Rotational molding was conducted under the same conditions as in Example 1 except that the thus-obtained liquid feedstock J was used, resulting in breakage during the evaporation of the solvent by keeping it at 120° C. No belt was obtained.

Because the ring opening polyaddition reaction between aromatic tetracarboxylic dianhydride and aromatic diamine is an exothermic reaction, when the temperature of the reaction system is increased, the equilibrium constant will become small, reducing the molecular weight of the resulting polyamide acid. When the diamine component consists of p-phenylenediamine, a highly crystallized structure is formed. It is assumed that this is what caused the breakage before attaining a satisfactory strength by polyimide conversion.

Regarding the polyimide seamless belts obtained in Examples 1 to 5 and Comparative Examples 1 to 5 described above, the following properties were evaluated.

The measurements of various physical properties were made according to the following methods.

(1) Nitrogen Adsorption Surface Area

The nitrogen adsorption surface area was measured according to JIS K6217 (low-temperature nitrogen adsorption method). In addition, the property data of commercially available carbon were used.

(2) DBP Absorption

DBP absorption was measured according to JIS K6217. In addition, the property data of commercially available carbon were used.

(3) Volatile Content of Carbon Black

The volatile content was measured according to JIS K6221. Specifically, the carbon black was heated at 950° C. for 7 minutes, and the weight percent reduction (weight %) of the carbon black with respect to the original weight was measured.

(4) Carbon Black pH

The pH value was measured based on ASTM D1512.

(5) Amount of Undecomposed Feedstock Hydrocarbon (PAH) Extracted from Carbon Black 5 g of carbon black was placed in a cylindrical glass filter paper after drying at 80° C. for 24 hours, and Soxhlet extraction was performed for 48 hours using 180 cc of monochlorobenzene as the solvent. The extract was concentrated, and the amount of extract was quantified using a liquid chromatogram. The result was divided by the carbon black weight to find the content. A liquid chromatograph analyzer, LC-6A (manufactured by Shimadzu Corporation), a flow controller, SCL-6A (manufactured by Shimadzu Corporation), and a detector, Waters 490E (Millipore: 5 µl injection) were used.

(6) Particle Size of Carbon Black

The particle size of carbon black in the solution was measured using a laser diffraction/scattering particle size distribution analyzer LA-920 (manufactured by Horiba, Ltd.).

(7) Solids Content of Polyamic Acid Solution Composition

The solids content of the carbon black-dispersed polyamic acid solution composition was calculated as follows. A sample was precisely weighed in a heat-resistant container such as a metal cup (sample weight A (g)). The sample in the heat-resistant container was placed in an electric oven and dried by heating the container in successively increasing temperature cycles of 120° C.×15 minutes, 180° C.×15 minutes, 260° C.×30 minutes, and 300° C.×30 minutes. After drying, the weight of the solid components of the sample was measured (solid weight B (g)). The values A and B were measured for 5 samples (n=5) obtained from the same specimen, and the solids content was determined using the following equation. The average of the 5 samples was used as the solids content.

Solids Content=$B/A \times 100$(%)

(8) Surface Resistivity of Semiconductive Belt

The surface resistivity (SR) was measured using a 400-mm sample cut from the produced semiconductive belt. The resistivity was measured at a total of 12 points, i.e., three equally-spaced points along the width direction, and four equally-spaced points along the circumferential direction, using a resistivity meter Hiresta IP·UR probe (manufactured by Mitsubishi Chemical Corporation). The average of these values was used as the surface resistivity of the semiconductive belt. The SR value was measured after applying 500 volts for 10 seconds.

(9) Flatness Measurement

Figure 1:
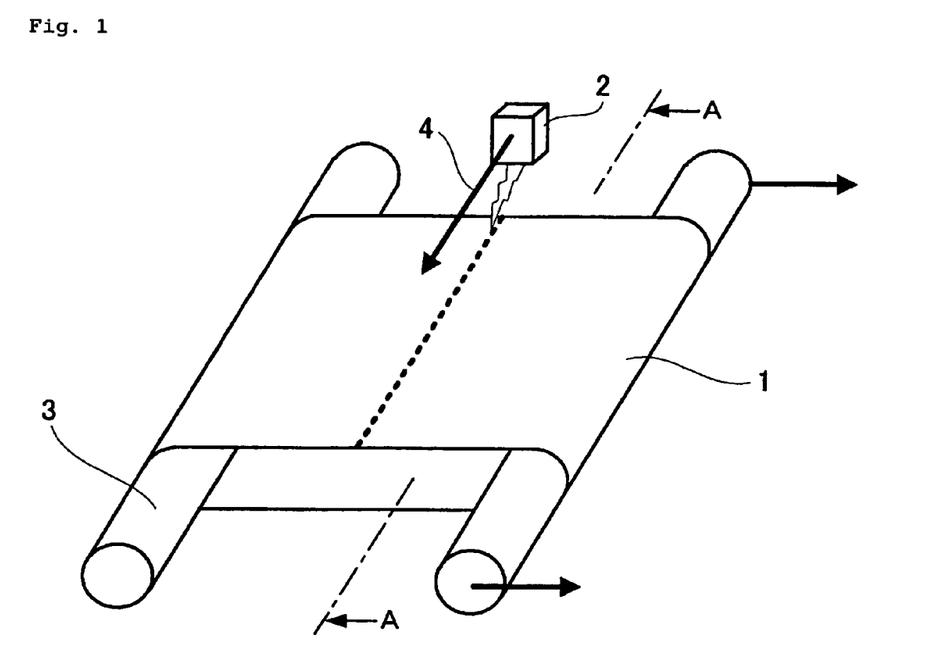
FIG. 1 is a schematic diagram showing the method for measuring flatness.
Figure 2:
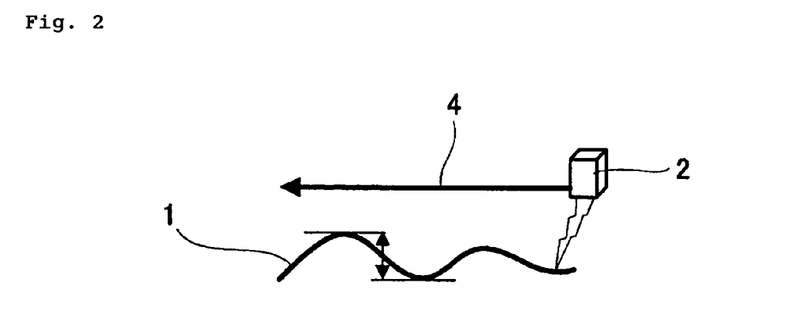
FIG. 2 shows a cross-sectional view along the line AA in FIG. 1.

Each of the resulting carbon black-loaded polyimide seamless belts was cut into pieces having a width of 350 mm. The thus-formed test pieces were stretched at 35 N using two rollers each having a diameter of 30 mm as shown in FIG. 1. Under such conditions, the amount of displacement on the surface of the belt in the width direction was detected using a laser displacement meter manufactured by Keyence Corporation (Model number: Type KL080)(2). The difference between the maximum value and the minimum value, as shown in FIG. 2, was determined as the flatness of the belt in the width direction.

Table 1 shows the main components and solids content of the polyamic acid solutions used in Examples 1 to 5 and Comparative Examples 1 to 5.

TABLE 1

| | | Main component of polyamic acid solution | | | Carbon black-dispersed liquid feedstock | | |
|---|---|---|---|---|---|---|---|
| | | Acid dianhydride (mol %) | Diamine component (mol %) | Solids content[1] (weight %) | Type of carbon black | Content of carbon black[3] (weight %) | Solids content[2] (weight %) |
| Example | 1 | a-BPDA (30) s-BPDA (70) | PPD (80) DADE (20) | 25 | CB1 | 23.3 | 25.2 |
| | 2 | a-BPDA (20) s-BPDA (80) | PPD (50) DADE (50) | 30 | | 25.0 | 28.6 |
| | 3 | a-BPDA (20) s-BPDA (80) | PPD (25) DADE (75) | 32 | CB2 | 19.2 | 28.8 |
| | 4 | a-BPDA (50) s-BPDA (50) | PPD (50) DADE (50) | 35 | | 22.2 | 30.8 |
| | 5 | a-BPDA (20) s-BPDA (80) | PPD (25) DADE (75) | 30 | SB4 | 15.3 | 24.3 |
| Comparative Example | 1 | s-BPDA (100) | PPD (100) | 18 | SB4 | 15.1 | 15.9 |
| | 2 | s-BPDA (100) | PPD (70) DADE (30) | 18 | | 15.1 | 15.9 |
| | 3 | s-BPDA (100) | PPD (100) | 18 | CB1 | 23.4 | 16.2 |

TABLE 1-continued

| | Main component of polyamic acid solution | | | Carbon black-dispersed liquid feedstock | | |
|---|---|---|---|---|---|---|
| | Acid dianhydride (mol %) | Diamine component (mol %) | Solids content[1] (weight %) | Type of carbon black | Content of carbon black[3] (weight %) | Solids content[2] (weight %) |
| 4 | s-BPDA (100) | PPD (70) DADE (30) | 18 | | 23.4 | 16.2 |
| 5 | a-BPDA (20) s-BPDA (80) | PPD (100) | 25 | | 23.3 | 25.2 | a-BPDA: 2,3,3',4'-biphenyltetracarboxylic dianhydride
s-BPDA: 3,3',4,4'-biphenyltetracarboxylic dianhydride
PPD: p-phenylenediamine
DADE: 4,4'-diaminodiphenyl ether
[1] Solids content of polyamic acid solution (free from carbon black)
[2] Solids content of feedstock comprising polyamic acid solution and carbon black
[3] Content of carbon black in total solid components contained in liquid feedstock Table 2 shows the surface conditions, surface resistivity, thickness (average thickness) and flatness of the polyimide seamless belts obtained in Examples 1 to 5, and Comparative Examples 1 to 5.

TABLE 2

| | Surface Conditions | Surface Resistivity ($\Omega$/sq.) | Thickness (μm) | Flatness (mm) |
|---|---|---|---|---|
| Example 1 | Excellent | $2.4 \times 10^{12}$ | 88-92 | 1.7 |
| Example 2 | Excellent | $4.2 \times 10^{10}$ | 89-92 | 1.4 |
| Example 3 | Excellent | $1.3 \times 10^{12}$ | 98-102 | 0.9 |
| Example 4 | Excellent | $4.5 \times 10^{12}$ | 98-102 | 1.2 |
| Example 5 | Excellent | $1.2 \times 10^{12}$ | 87-93 | 1.1 |
| Comparative Example 1 | Scale-like patterns | $1.2 \times 10^{12}$ | 86-93 | 5.2 |
| Comparative Example 2 | Stripe patterns | $2.5 \times 10^{12}$ | 96-105 | 4.4 |
| Comparative Example 3 | Scale-like patterns | $1.4 \times 10^{12}$ | 88-92 | 4.6 |
| Comparative Example 4 | Stripe patterns | $2.2 \times 10^{12}$ | 96-104 | 3.8 |
| Comparative Example 5 | Breakage | — | — | — |

In Comparative Examples 1 to 4, the solids content of the liquid feedstock is low, and it takes a long time to evaporate the large amount of organic polar solvent. Accordingly, production efficiency is extremely poor. Further, "floating" occurred, and scale-like patterns and stripe patterns appeared as the dispersion state of the carbon black became nonuniform possibly due to factors such as the buoyancy and the surface tension that cause heat convection or evaporative convection in the drying step of rotational molding, and viscosity and density changes that occur as the solvent evaporates. In Comparative Example 5, in spite of the high solids content of the liquid feedstock, no belt was obtained.

Using the semiconductive polyimide belts of Examples 1 to 5 as the image transfer belt of a color image-forming unit ensured a stable charge and suitable charge removal, and obtained stable, high-quality transfer images over extended periods of time.

| Explanation of numerical symbols | |
|---|---|
| 1 | Seamless (jointless) tubular film |
| 2 | Laser displacement meter |
| 3 | Roller |
| 4 | Scanning direction of laser displacement meter |

The invention claimed is:

1. A carbon black-dispersed polyamic acid solution composition
comprising a polyamic acid solution and carbon black dispersed therein, the polyamic acid solution being obtained by reacting biphenyltetracarboxylic dianhydride and an aromatic diamine in an organic polar solvent,
the biphenyltetracarboxylic dianhydride comprising 2,3,3',4'-biphenyltetracarboxylic dianhydride and 3,3',4,4'-biphenyltetracarboxylic dianhydride; the aromatic diamine comprising 4,4'-diaminodiphenyl ether and p-phenylenediamine; and the polyamic acid solution having a solids content of 25 weight % or more,
wherein the polyamic acid solution comprises 15 to 50 mol % of 2,3,3',4'-biphenyltetracarboxylic dianhydride and 85 to 50 mol % of 3,3',4,4'-biphenyltetracarboxylic dianhydride per total biphenyltetracarboxylic dianhydride components; and 20 to 80 mol % of 4,4'-diaminodiphenyl ether and 80 to 20 mol % of p-phenylenediamine per total aromatic diamine components.

2. The carbon black-dispersed polyamic acid solution composition according to claim 1, wherein the carbon black content is 15 to 30 weight % based on total solids of the carbon black-dispersed polyamic acid solution composition.

3. The carbon black-dispersed polyamic acid solution composition according to claim 1, wherein the carbon black is obtained by subjecting carbon black produced by an oil furnace process to oxidation treatment, and wherein the carbon black after the oxidation treatment has a pH of 2 to 5, a volatile matter content of 2 to 6 weight %, a nitrogen adsorption specific surface area of 60 to 150 m$^2$/g, a dibutyl phthalate absorption of 40 to 120 ml/100 g, and an amount of extracted undecomposed feedstock hydrocarbons of 10 ppm or less.

4. A semiconductive polyimide resin belt comprising a polyimide resin and carbon black, the polyimide resin comprising structural units represented by Formulae (1) to (4):

[Chem. 1]

(1)

[Chem. 2]

(2)

[Chem. 3]

(3)

[Chem. 4]

(4)

5. A process for producing a semiconductive polyimide resin belt by molding the carbon-black-dispersed polyamic acid solution composition of claim 1 into a tubular shape by rotational molding, and subsequently imidizing the molded product by heat treatment, the process comprising the steps of:
   (1) applying the carbon black-dispersed polyamic acid solution composition to an inner surface of a cylindrical mold while the cylindrical mold is rotated at a centrifugal acceleration of 0.5 to 10 times the gravitational acceleration;
   (2) forming a self-supporting film by heating the cylindrical mold at a temperature of 100 to 140° C. while the cylindrical mold is rotated at a centrifugal acceleration of 0.5 to 10 times the gravitational acceleration; and
   (3) imidizing the film at a temperature of 300° C. or more, with the film adhering to the inner surface of the cylindrical mold.

6. A semiconductive polyimide resin belt produced by the process of claim 5, having a surface resistivity of $10^8$ to $10^{14}$ Ω/sq.

7. A semiconductive polyimide resin belt produced by the process of claim 5, having a flatness of 2 mm or less in a width direction of the belt.

* * * * *